United States Patent Office 3,354,782
Patented Nov. 28, 1967

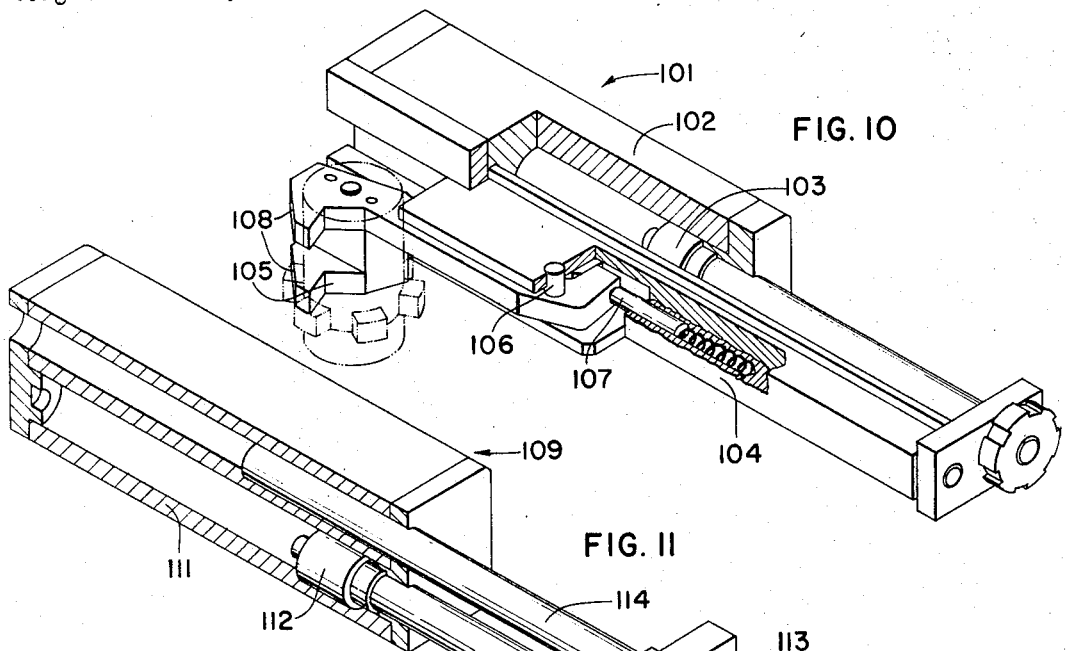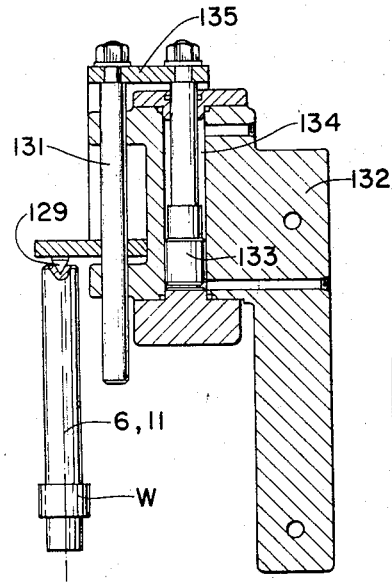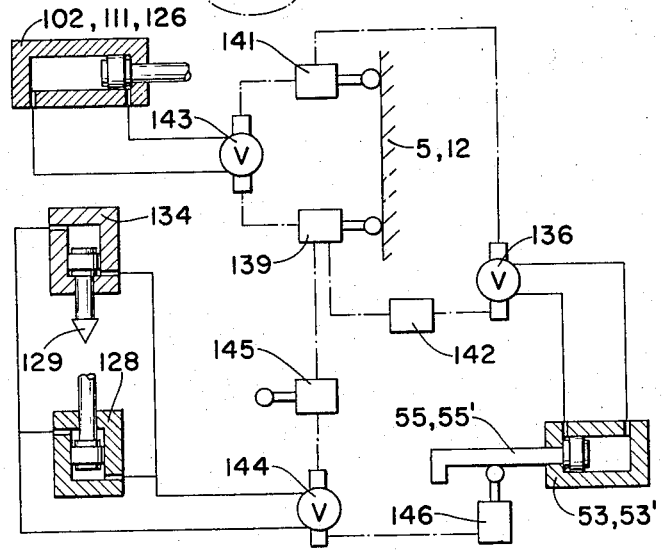

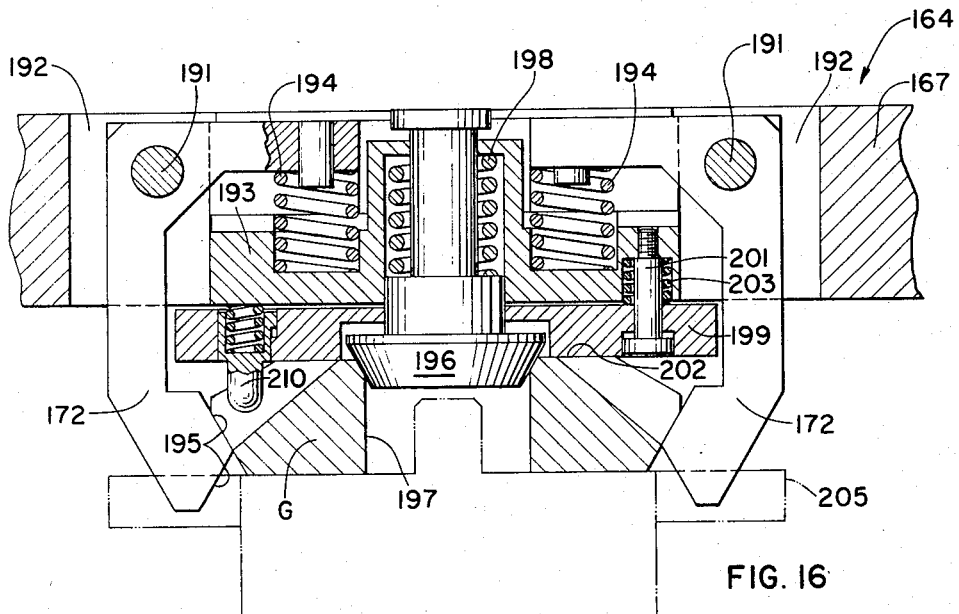
FIG. 16
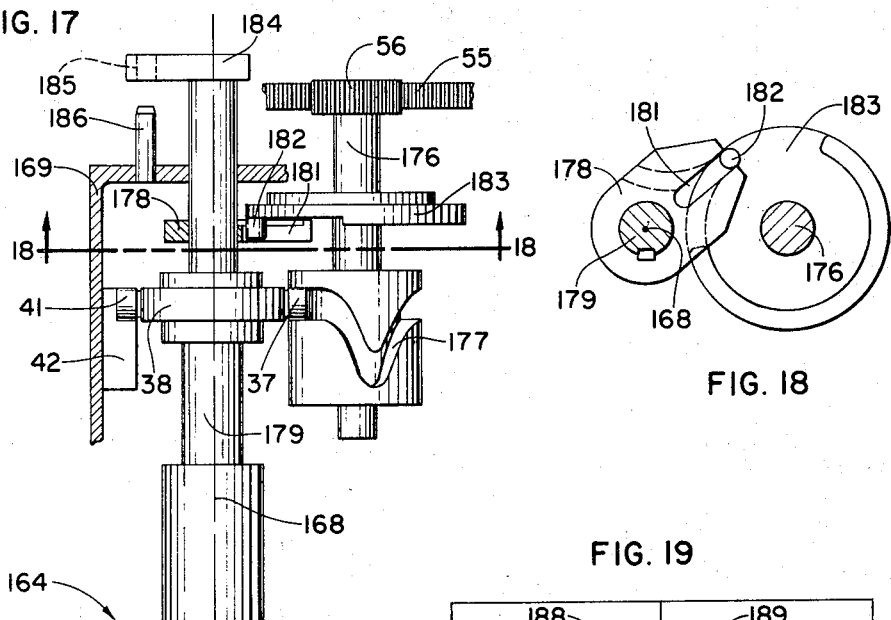
FIG. 17
FIG. 18
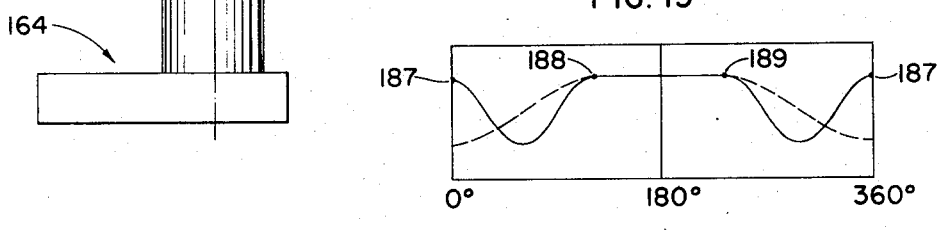
FIG. 19

3,354,782
TOOTH CUTTING MACHINE WITH WORK HANDLING MECHANISM
William G. Buchanan and George H. Howing, Rochester, N.Y., assignors to The Gleason Works, Rochester, N.Y., a corporation of New York
Continuation of application Ser. No. 356,711, Apr. 2, 1964. This application Mar. 24, 1966, Ser. No. 537,243
10 Claims. (Cl. 90—1)

ABSTRACT OF THE DISCLOSURE

A bevel gear cutting machine has an endless chain conveyor with work holders for transferring work gears from a first carrier, which loads and unloads the work spindle at a rough cutting station at one side of the machine, to a second carrier which loads and unloads the work spindle at a finish cutting station on the other side of the machine. A pair of ratcheting actuators, connected for simultaneous operation, act on the conveyor at points near the respective carriers. Both carriers have reciprocating and angular motion, and have work supporting recesses on their peripheries. A stationary cam ejects the gears from the recesses of the carrier at the finishing station. The conveyor is guided along inner and outer U-shaped paths which extend along the two sides and the back of the machine, and have the open ends of their U-shapes joined by semi-circular path portions adjacent the carriers. The conveyor guide means are adjustable to enable simultaneous registration of the work holders with both carriers, and include guide sections which have articulated connections to accommodate reciprocation of a slide on which the finishing station carrier and the work spindle are mounted.

---

This is a continuation of application Ser. No. 356,711, filed Apr. 2, 1964 and now abandoned. The invention relates to a tooth cutting machine, especially of the kind disclosed in co-pending application Ser. No. 337,121 filed Jan. 7, 1964 by Thomas A. Deprez et al., now Patent No. 3,229,585, granted Jan. 18, 1966 and relates particularly to an improved work handling mechanism of such machine.

The machine disclosed in said co-pending application has a pair of cutters adapted respectively to rough and finish cut workpieces that are chucked on indexing work spindle adjacent the cutters. The object of the invention is a simple and inexpensive yet reliable mechanism for delivering workpieces to the roughing work spindle, transferring roughed workpieces from the roughing work spindle to the finishing work spindle, and discharging the finished workpieces. A related object is a mechanism in which blank and roughed workpieces are held ready to be placed on the work spindles as soon as workpieces cut in the preceding cutting cycle are removed from these spindles. Other objects are a mechanism which will accurately register with the work spindles of the machine and yet will accommodate the cutting motions and adjustments required of the machine, including reciprocation of the finishing work spindle to stroke a workpiece thereon past the finishing cutter, and adjustment of the work spindles to accommodate variation in cutter diameters.

The foregoing and other objects and advantages of the invention will appear from the following description of the preferred embodiments shown in the accompanying drawings, wherein.

Figure 1:
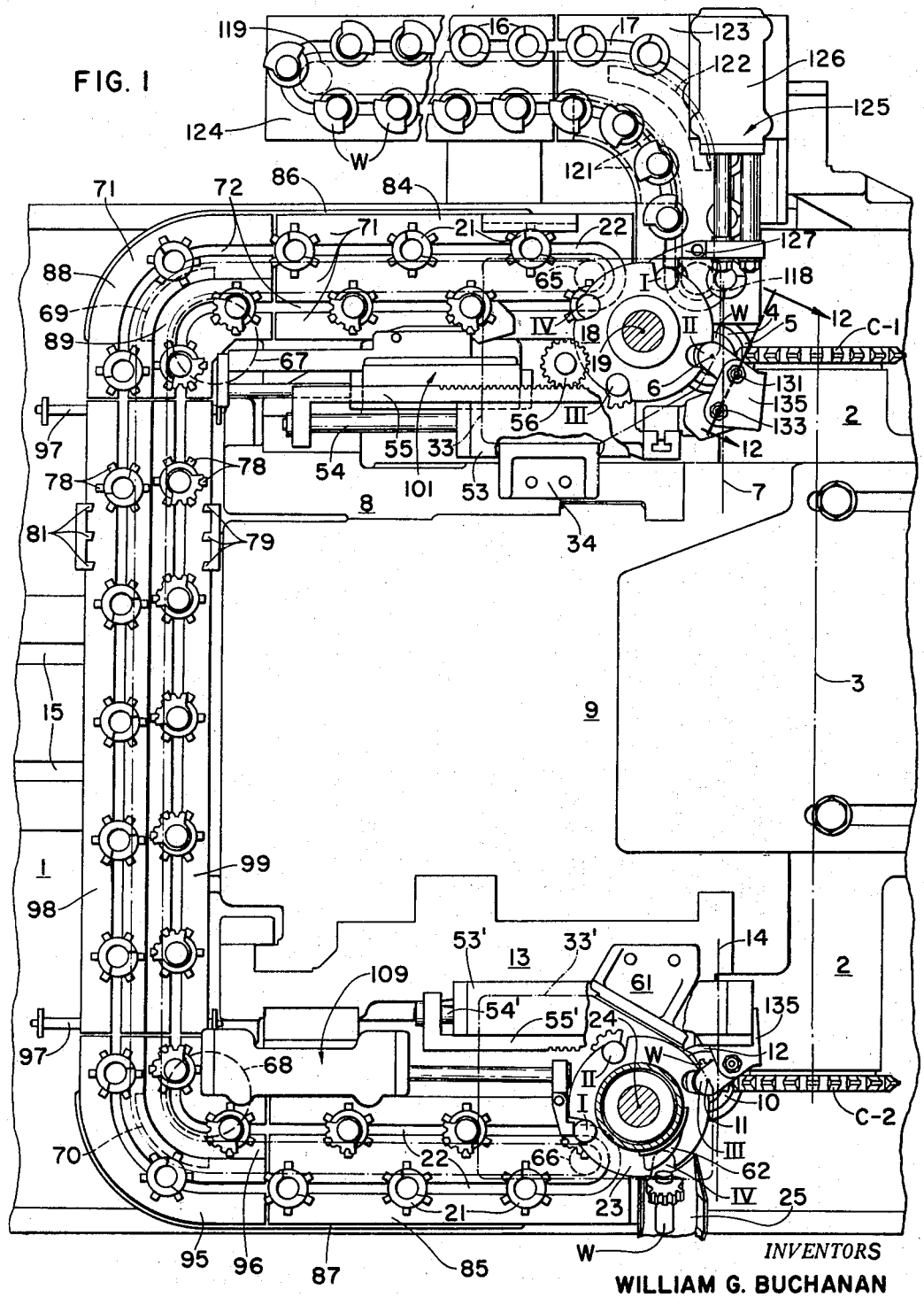
FIG. 1 is a fragmentary plan view of the machine.
Figure 3:
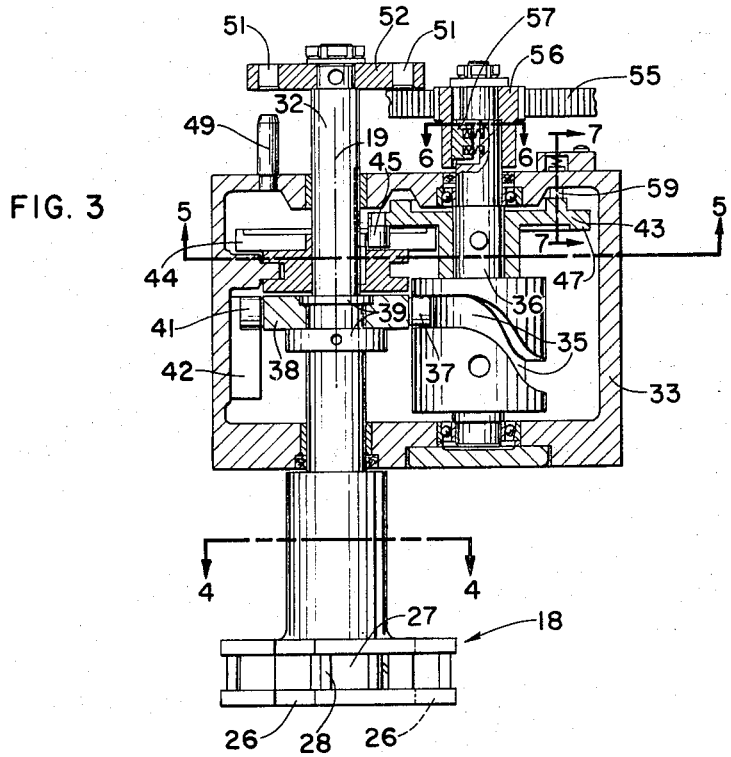
FIG. 3 is a side view, partly in vertical section, of a work carrier adjacent the roughing work spindle and the actuator for the carrier.
Figure 5:
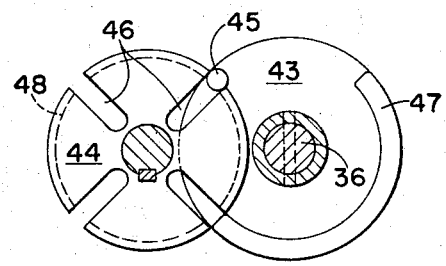
Figure 6:
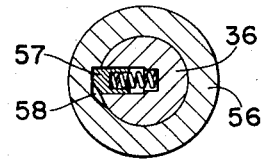
Figure 7:
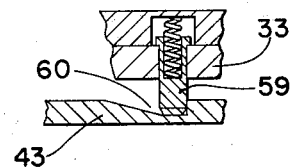
Figure 8:
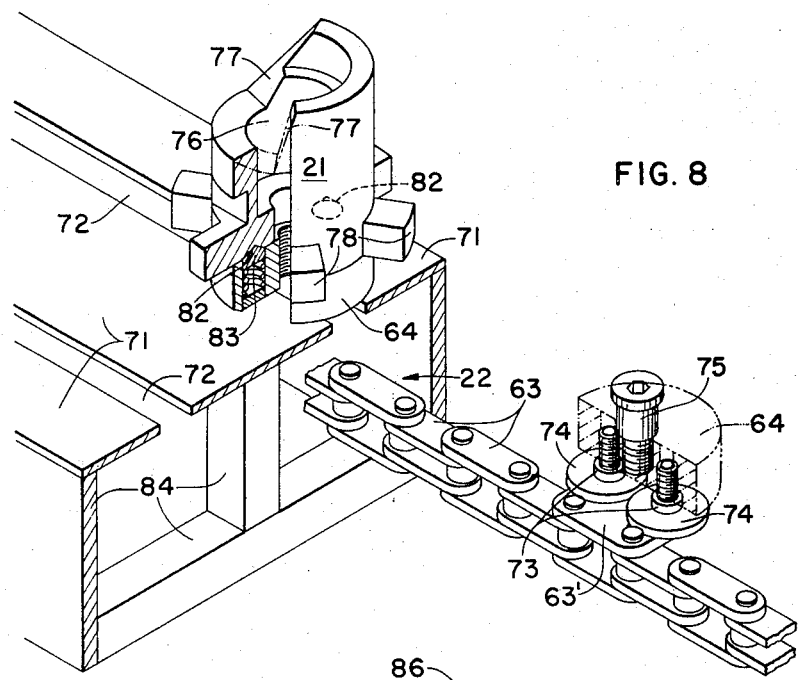
Figure 9:
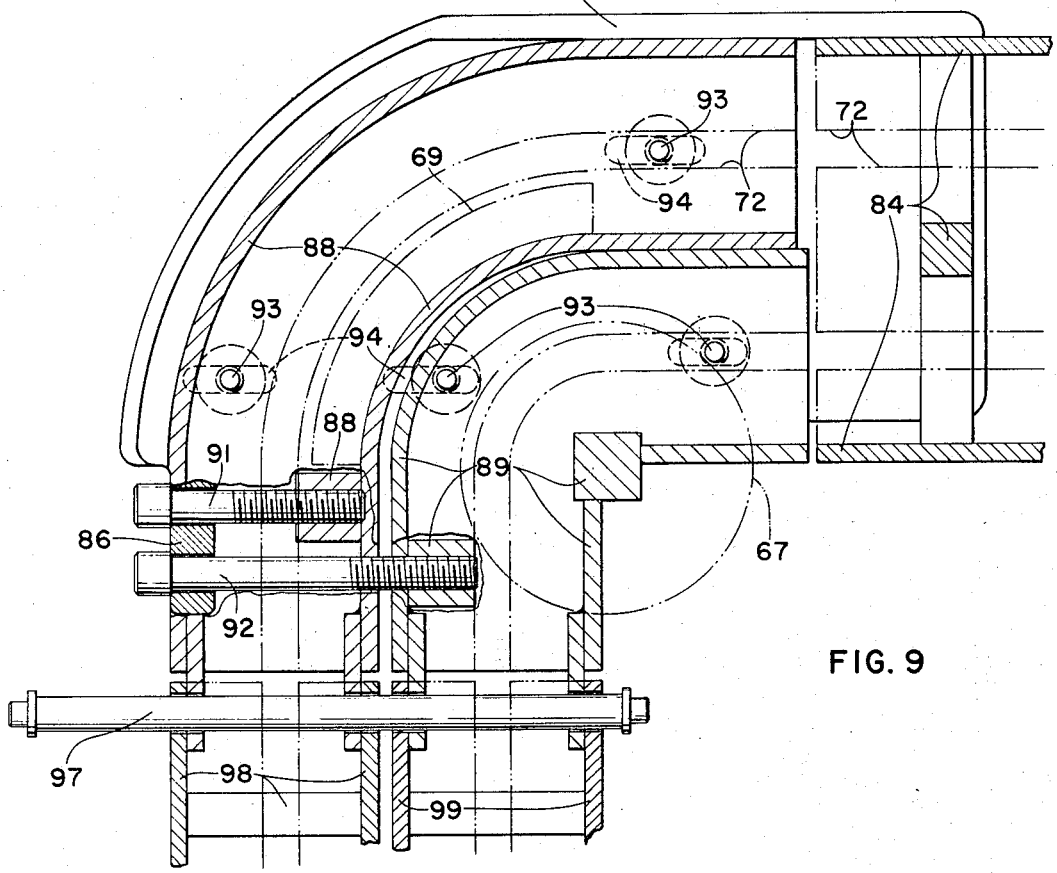
Figure 14:
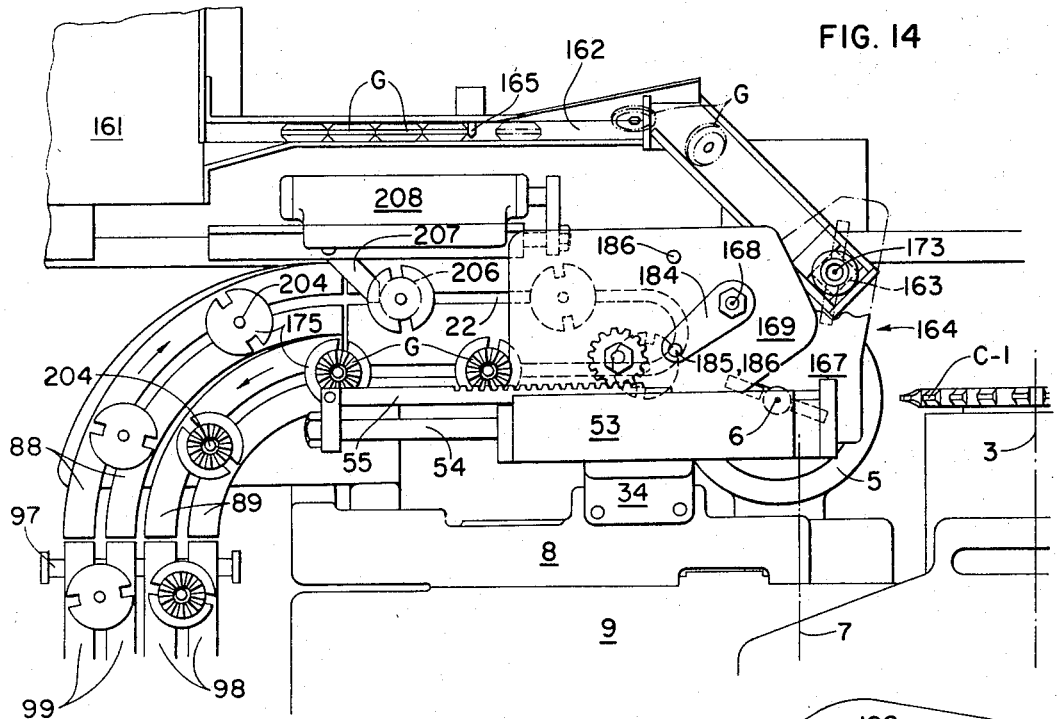
Figure 15:
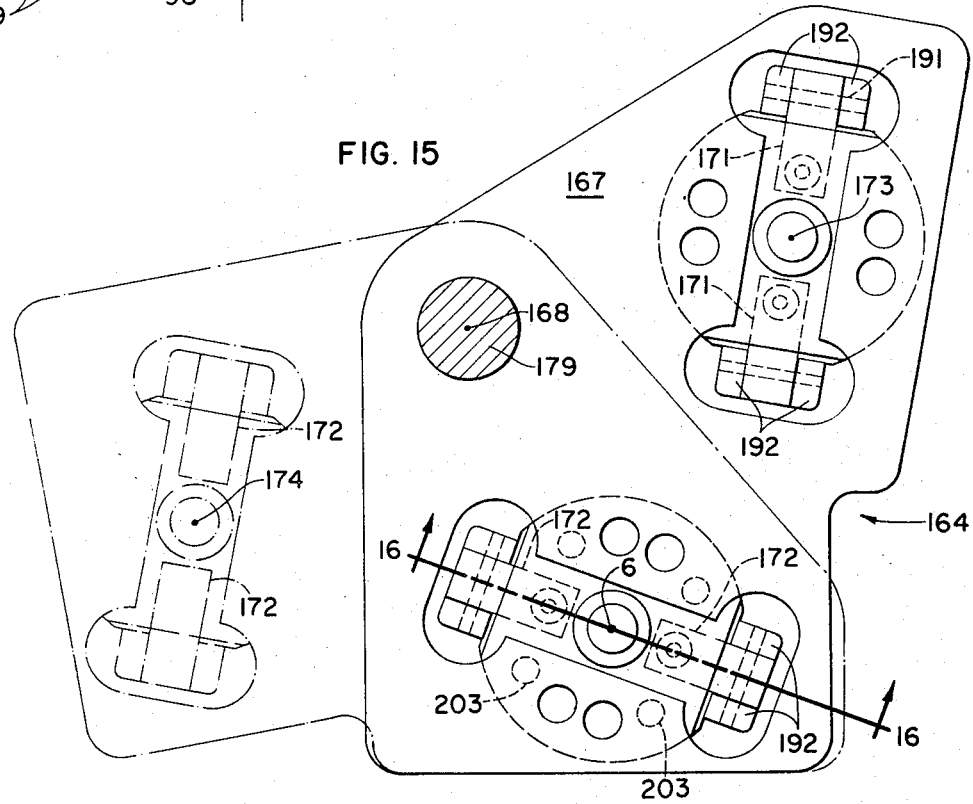
Figure 20:
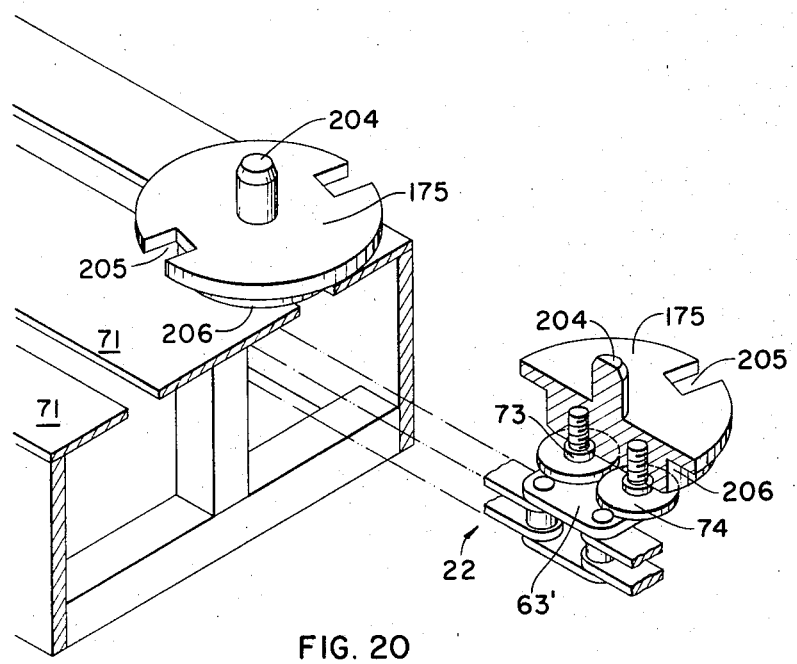
Figure 21:
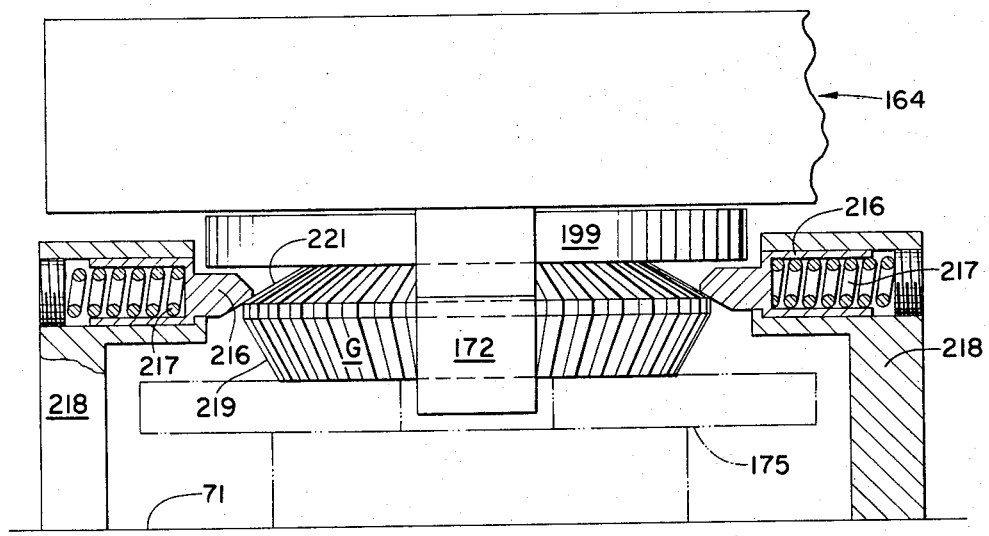
Figure 22:
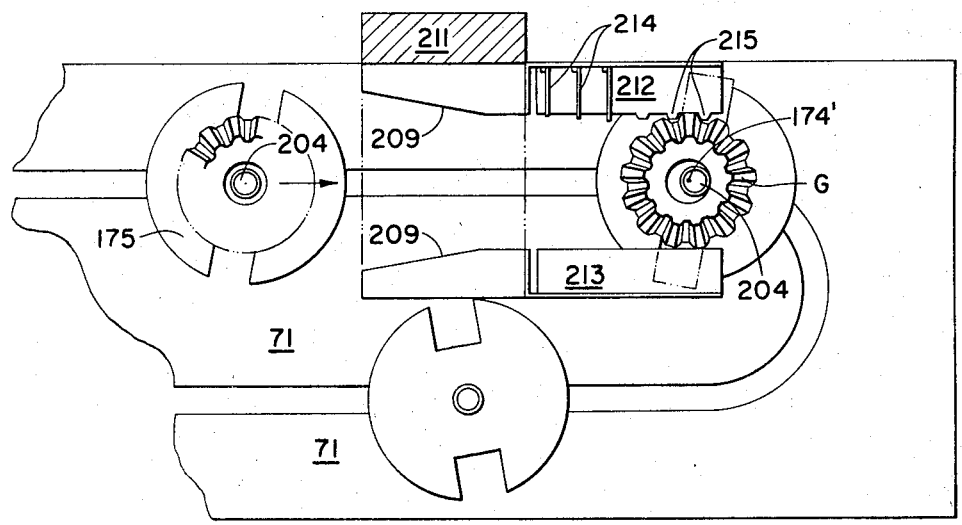
Figure 23:
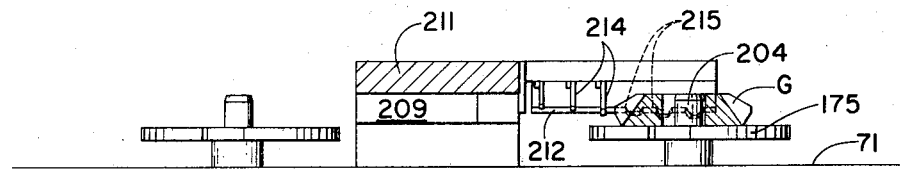

FIGS. 5, 6 and 7 are detail views, respectively in planes 5—5, 6—6 and 7—7 of FIG. 3;

FIG. 8 is an isometric view of a portion of an endless flexible conveyor, one of the work supports carried thereby, and supporting guide structure;

FIG. 9 is a detail plan sectional view illustrating means for adjusting the tension of the endless conveyor;

FIGS. 10 and 11 are isometric views of the conveyor actuators respectively adjacent the roughing and the finishing work spindles;

FIG. 12 is a sectional view in plane 12—12 of FIG. 1 through a work-supporting center and actuating means therefor;

FIG. 13 is a diagram of the control system of the work-handling mechanism of the machine;

FIG. 14 is a fragmentary plan view of a modification of the machine, for producing bevel gears having axial bores;

FIG. 15 is a plan view, on a large scale, of a work carrier shown in FIG. 14;

FIG. 16 is a vertical section in plane 16—16 of FIG. 15;

FIG. 17 is a side view of the actuator for the work carrier shown in FIGS. 14 and 15;

FIG. 18 is a bottom plan section in plane 18—18 of FIG. 17;

FIG. 19 is developments of cams shown in FIGS. 3 and 17;

FIG. 20 is a detail isometric view, similar to FIG. 8, of the conveyor guide and work holder structure shown in FIG. 14;

FIG. 21 is a detail vertical sectional view of means for stripping work gears from the work carrier of FIGS. 14 to 16; and FIGS. 22 and 23 are respectively plan and side views of a mechanism for coarse stock dividing roughed gears.

The machine comprises a frame 1 rigidly supporting a housing 2 in which a cutter spindle is continuously rotatable about horizontal axis 3, this spindle having secured to its opposite ends disc-shaped roughing cutter C–1 and finishing cutter C–2 each of which cuts in successive tooth slots in a workpiece on successive revolutions thereof. The cutters have gaps, not shown, between the last and first blades thereof, and each time these gaps come abreast of the work, the latter is indexed about its rotation axis to bring a successive tooth space into cutting position, without wihdrawing the work from the cutters.

The workpieces W in the first embodiment to be described are steering gear sectors with shanks at both ends thereof. They are chucked for roughing on a work spindle 4 which is journaled in a work head 5 for indexing rotation about its axis 6. This axis lies in the median plane of rotation of cutter C–1 and, in the work loading-unloading position of spindle 4, is vertical, while in cutting position, shown in FIG. 1, is slightly inclined, by a rotation of the work head about horizontal axis 7 which advances the work to the roughing cutter. The work head 5 is pivoted on axis 7 to a slide 8 which is adjustable horizontally and vertically, in directions perpendicular to axes 3 and 7, on a column 9, to accommodate cutters C–1 of different diameters and workpieces of different designs.

For finish cutting the workpieces are chucked on a work spindle 10 whose axis 11 lies in the median plane of rotation of cutter C-2. This spindle is journaled for indexing rotation in work head 12 which is pivoted to vertical slide 13 on horizontal axis 14 to enable motion of axis 11 between a vertical position, for loading and unloading of the work, and an inclined position in which the work is cut. Slide 13 is vertically adjustable to accommodate workpieces of different designs and is also vertically reciprocable on column 9 in time with cutter rotation. The column is adjustable horizontally on frame 1, along ways 15, to accommodate work of different designs and variations in cutter diameter. The mechanisms for effecting the relative adjustments and the machine motions so far described may be substantially as disclosed in the aforementioned co-pending application.

In the first embodiment, illustrated in FIGS. 1 to 13, the workpieces W are manually or otherwise loaded onto work holders 16 on an endless flexible conveyor 17 which advances stepwise to deliver them to station I of a carrier 18 adjacent roughing spindle 4. This carrier indexes by 90° increments about its vertical axis 19 to successively carry the workpieces to cutting station II where they are chucked on spindle 4, then, after cutting and dechucking, to idle station III, and finally to discharge station IV. Here they are received by work holders 21 of another endless flexible conveyor 22 which is of generally U-shape in plan, and extends along both sides and the back of column 9. By stepwise advance this conveyor delivers the workpieces to station I of a carrier 23 adjacent finishing spindle 10. This carrier, similar to carrier 18, advances the workpieces successively about axis 24 to idle station II, then to cutting station III where they are chucked on spindle 10, and finally, after finish cutting and dechucking, to station IV where they are ejected into a discharge chute 25.

The carrier 18, FIGS. 1 to 4, is of substantially disc shape, with four equi-spaced recesses 26 in the periphery thereof for receiving the shanks of the workpieces W. Detents 27, slidably retained in slots in the edge of the disc by pins 28, are urged by springs 29 into engagement with the workpiece shanks. The springs are retained by blocks 31 pinned in the slots. The detents grip the workpieces with sufficient pressure to hold them firmly in the carrier during vertical motion and rotation of the latter, but yield to permit their intentional removal.

The carrier is secured to a shaft 32 that is journaled for rotation and axial reciprocation, about and along its axis 19, in a housing 33 that is mounted on a bracket 34, FIG. 1, on slide 8. For effecting the reciprocation a barrel cam 35 is mounted on a shaft 36 in the housing, the cam engaging a follower roller 37 carried by a member 38 that is confined between collars 39 on shaft 32. Member 38 also carries a roller 41 engaged in a straight vertical guide slot 42 in housing 33, which serves to hold the member against rotation about axis 19. For effecting intermittent rotation of the carrier and its shaft 32 through increments of 90°, there is a Geneva drive, FIGS. 3 and 5, comprising driver 43 on shaft 36 and driven wheel 44 keyed for axial motion to shaft 32. The driver has a pin 45 which on successive turns of shaft 36 enters succeeding radial slots 46 in the driven wheel and advances the latter by a quarter-turn. An arcuate flange 47 on the driver 43 enters notches in a peripheral flange 48 on the driven wheel as the pin 45 leaves each slot 46, and leaves the notch as the pin enters the next slot, so that the wheel is at no time free of the driver. The angular position of carrier 18 is closely controlled by engagement of a vertical pin 49 in one of four close fitting bores 51 which are provided at equally spaced intervals around a disc 52 secured to the upper end of shaft 32.

The phase relation between cam 35 and the Geneva drive 43, 44, is such that on each turn of shaft 36, the following actions occur: Cam 35 lifts the carrier 18. At this time the carrier grips workpieces which the upwardly moving carrier strips from the holder 16 of conveyor 17 at station I and from the work spindle 4 at station II; and the disc 52 disengages pin 49. The Geneva drive then rotates the carrier through 90°, clockwise in FIGS. 1 and 4 and counterclockwise in FIG. 5; and cam 35 then lowers the carrier. This engages pin 49 in a bore 51, places the blank workpiece now at station I on spindle 4 and the roughed workpiece now at station IV onto a holder 21 of conveyor 22.

Figure 2:
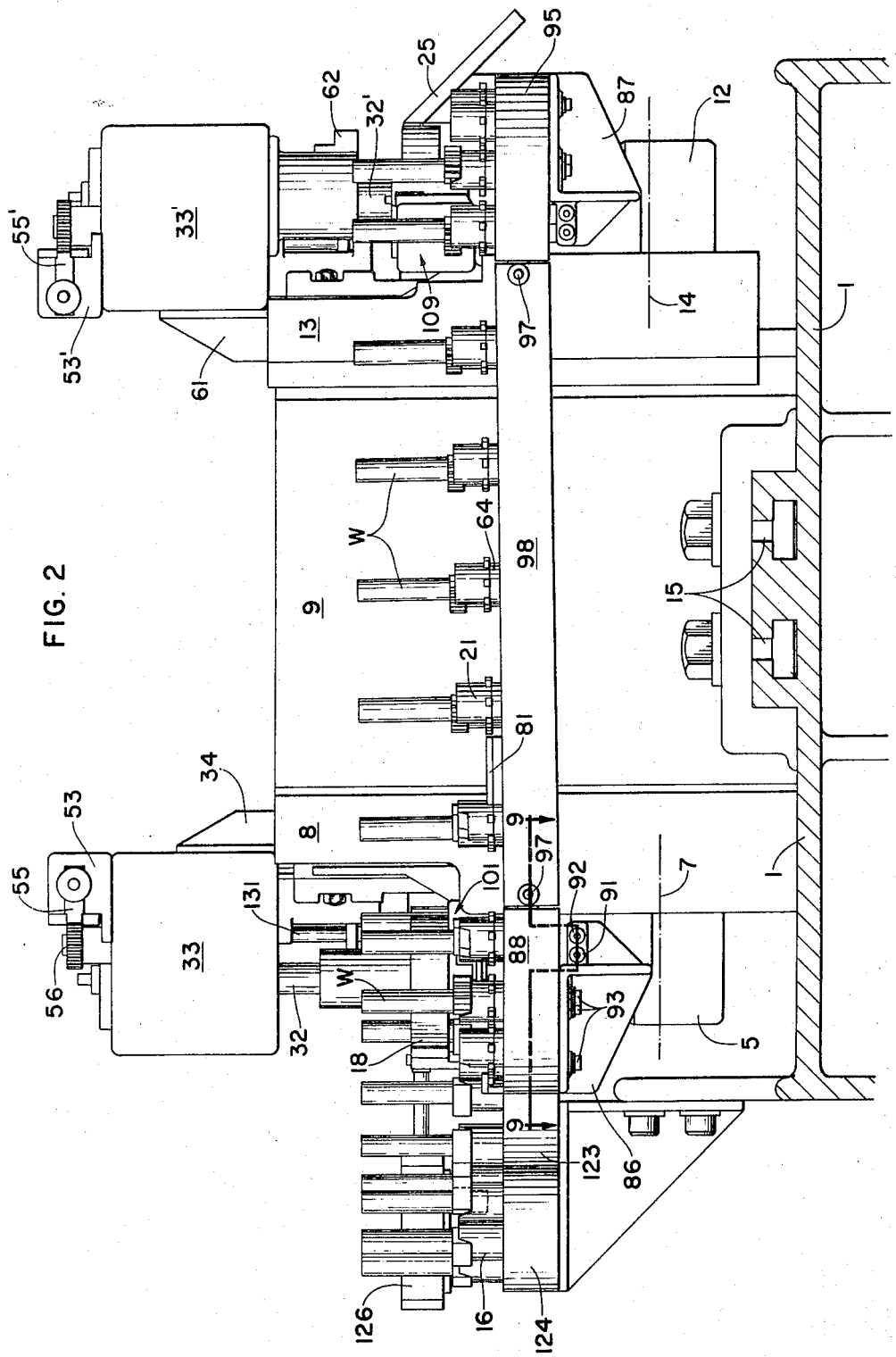
FIG. 2 is an end view of the machine, from the left in FIG. 1.

Shaft 36 is driven, intermittently and unidirectionally, by a piston in cylinder 53, FIGS. 1 and 2, connected by rod 54 to rack 55 which meshes a pinion 56. The pinion is rotatable on shaft 36, clockwise in FIGS. 1 and 6, but imparts counterclockwise motion to the shaft through a spring-backed clutch dog 57 which is engageable in a clutch recess 58 in the hub of the pinion. On each stroke of the piston, to the right in FIG. 1, the shaft 36 is turned counterclockwise by one complete turn, while on each return stroke of the piston, rack 55 and pinion 56 return free of shaft 36. The shaft is held against such return by a spring-backed pawl 59, FIGS. 3 and 7, which is slidably supported by housing 33 and engages in a recess 60 in driver 43 at the end of each turn of the latter.

Carrier 23 is operated in substantially the same manner as carrier 18, by a mechanism contained in a housing 33' mounted on bracket 61 on vertical slide 13, this mechanism being substantially like that in housing 33, and being actuated by a piston in cylinder 53' through a piston rod 54' and rack 55' simultaneously with operation of the piston in cylinder 53. On each reciprocation of rack 55', the carrier 23 is reciprocated axially and advanced angularly, clockwise in FIG. 1, to carry workpieces successively from receiving station I, to idle station II, then to cutting station III and finally to discharge station IV. As the latter is approached a stationary cam 62 on housing 33' cams the workpiece out of the carrier, from which it drops into chute 25.

The endless flexible conveyor 22 comprises a chain of vertically pivoted links 63 of which uniformly spaced links 63' carry supports 64, FIGS. 2 and 8, for work holders 21. The conveyor runs in a substantially horizontal path around guide discs 65 and 66, FIG. 1, respectively adjacent carriers 18 and 23, guide discs 67 and 68, and arcuate guide shoes 69 and 70. Accordingly the conveyor comprises an inner section of U-shaped in plan extending from disc 65 around discs 67 and 68 to disc 66, and further comprises an outer section, also of U-shape, extending from disc 66 around shoes 70 and 69 to disc 65. The inner section is regarded as being the forward section since it carriers workpiece from carrier 18 on to carrier 23, whereas the outer section is the return section, which returns empty work holders 21 to the carrier 18. As shown, the legs of the U-shapes between disc 65 and the disc and shoe 67, 69, and between disc 66 and disc and shoe 68, 70, extend along opposite sides of column 9, and are connected by the arcuate portions of the U-shapes which extend 90° around the discs 67, 68, and the shoes and which connect the legs of the U to the substantially straight bases thereof which extend along the back of the column, between discs 67, 68 and between shoes 69, 70.

The conveyor is partially housed within and supported by a plurality of box-like guide sections, which, considered together, are of substantially U-shape in plan, FIG. 1. As shown in FIGS. 1 and 8, these guides have horizontal upper plates 71 on which the work holder supports 64 are slidable. Adjacent plates 71 are spaced to provide guide slots 72 through which extend spacing sleeves 73. These, together with washers 74, are interposed between links 63' and the supports 64. The links, spacer sleeves, washers, and supports are connected by screws, while headed vertical pins 75 screw threaded to supports 64 rotatably connect the work holders 21 to the supports. The spacer sleeves 73 constitute loose fitting keys in the slots 72 which prevent any substantial relative rotation of the supports 64.

The work holders 21 have vertical bores 76 coaxial with pins 75 for receiving the shanks of the workpieces, and inclined side faces 77 which are designed to engage the opposite sides of the body portions of the workpieces, as the latter are lowered into the work holders to cam them into the predetermined angular relation, about the axes of their shanks, in which they are to be engaged with the carriers 18 and 23. In order for them to engage both carriers in the same relation, it is necessary to rotate the workpieces through 180° during their forward travel in the conveyor 22. For this purpose teeth 78 are provided around the work holders 21 and sets of teeth 79 and 81 are provided on the guide structure, FIG. 1. Teeth 79 rotate each work holder 180° about its pin 75 during forward travel thereby, while teeth 81 further rotate it 180° during its return travel. For accurately limiting these rotations to 180°, and preventing accidental rotations, each carrier has two diametrically opposite recesses 82, FIG. 8. At the conclusion of each 180° rotation of the work holder, one of these recesses is engaged by a spring-backed detent 83 that is slidable in the related support 64.

Each work holder 21 must be aligned vertically with the recess 26 at station I in carrier 18 at the same time that another work holder is similarly aligned with the corresponding recess at station I of carrier 23; and this relationship must be maintained when the slide 8 and the column 9 are adjusted horizontally to compensate for changes in the diameters of cutters C–1 and C–2 respectively, caused by cutter resharpening or replacement, or to accommodate work gears of a different design. For this purpose the box-like chain guide sections are made relatively adjustable. The sections designated 84 and 85, adjacent the carriers 18 and 23, are rigidly secured to brackets 86 and 87, respectively, which are rigid with slides 8 and 13 and rotatably support the discs 65 and 66. Referring to FIG. 9, the arcuate guide shoe 69 and the disc 67 are respectively carried by sections 88 and 89 which are supported by bracket 86 for horizontal adjustment thereon, perpendicularly to cutter axis 3, FIG. 1. Such adjustment may be made by loosening or tightening horizontal screws 91 and 92 which are rotatable in bracket 86 and are screw-threaded respectively into guide sections 88 and 89. After such adjustment these sections may be rigidly secured to the bracket by tightening screws 93 which extend through threaded openings in the sections and through elongated slots 94 in the bracket.

Guide sections 95 and 96, which respectively support guide shoe 70 and disc 68, are adjustably supported by bracket 87 in substantially the same manner that sections 88 and 89 are supported by bracket 86. Horizontal pivot pins 97, one of which is supported by sections 88, 89, and the other by sections 95 and 96, extend in the directions in which these sections are adjusted. These pins pivotally support straight guide sections 98 and 99 which constitute the base of U-shaped guide structure and respectively support the return portion of the conveyor between guide sections 95 and 88, and the forward portion of the conveyor between guide sections 89 and 96. The pivotal support enables the bracket 87, the guide sections 85, 95, 96, and the portions of the conveyor 22 supported thereby, to reciprocate vertically in unison with slide 13 and finishing work head 12. In adjusting the guide sections 88, 89, 95, 96, the screws 91 and 92 may first be loosened and the work holders 21 nearest carriers 18 and 23 are brought into accurate vertical alignment with the work engaging recesses 26 in these carriers at their stations IV and I respectively. Screw 91 of guide sections 88 and the corresponding screw of section 95 may then be turned to adjust the tension of the return portion of conveyor 22 while maintaining section 98 substantially perpendicular to sections 84 and 85 (to prevent binding at the pivots 97); and similarly screw 92 of section 89 and the corresponding screw of section 96 may be turned to adjust the tension of forward portion of the conveyor while keeping section 99 substantially perpendicular to sections 84 and 85.

In order to accurately align the work holders 21 at station IV of carrier 18 and at station I of carrier 23, and to prevent undue loads on the conveyor 22 and its supporting and guide means, two actuators for the conveyor are provided, one of them adjacent each carrier. Adjacent carrier 18 there is the actuator 101 shown in detail in FIG. 10, comprising hydraulic cylinder 102 mounted on bracket 86, FIG. 1. Piston 103 in the cylinder is rigidly connected to a slide 104 supported by the cylinder. A puller-pawl 105 is pivoted to the slide by a pin 106, and is urged to its counterclockwise limit position about this pin by a spring-backed plunger 107. In this limit position the claw-shaped end of the pawl is engageable, as shown in broken lines in FIG. 10, with a work holder 21 on the forward path of guide section 84. On each forward stroke of the piston, to the left in FIG. 1 and to the right in FIG. 10, the pawl so engages a holder and advances it, and the conveyor, by one pitch, i.e. to move one work holder from station IV and bring the following work holder to this station. On each return stroke of the piston, cam surfaces 108 of the pawl ride over and engage behind the next work holder.

The actuator 109, FIGS. 1 and 11, comprises a cylinder 111 secured to bracket 87 and having reciprocable therein a piston 112 whose piston rod is rigidly connected by a head 113 to a guide rod 114 that is also slidable in the cylinder block. A pusher pawl 115 pivoted by a pin 116 to head 113 is engageable, in its clockwise limit position, with a work holder 21 on the forward path of guide section 85; and surfaces 120 of the pawl are engageable with a workpiece W in the work holder. The pawl is urged clockwise by a torsion spring 117 which allows pivotal motion of the pawl to ride over a work holder, to a position therebehind, during each return stroke of the piston and pawl assembly 112, 115. On each forward stroke a work holder and the conveyor is advanced by one pitch of the conveyor.

The conveyor 17 has substantially the same pivoted link construction as the conveyor 22, differing therefrom primarily in that the work holders 16 are rigidly connected to parts which correspond to supports 64 in FIG. 8. The conveyor runs over guide discs 118 and 119 and arcuate guide shoes 121 and 122. Disc 118 and shoes 121, 122 are supported by a guide section 123 and disc 119 by a guide section 124, these sections being similar in construction to section 84 shown in FIG. 8, and section 123 being rigidly mounted on an extension of bracket 86. Means not shown, similar to means 92–94 in FIG. 9, are provided to adjust section 124 horizontally relative to section 123, in a direction perpendicular to axis 3, for adjusting the tension of conveyor 17. An actuator 125 is provided for the conveyor, this actuator being substantially like those designated 109, 115 in FIG. 11, and including a cylinder 126 secured to the guide section 123 and a pusher pawl 127 for engagement with work holders 16 and workpieces W.

The lower shanks of the workpieces are chucked on the work spindles 4, 10 by means including an hydraulic chuck actuator 128, FIG. 13, in each work head 5, 12. Preferably the chucking apparatus is as disclosed in copending application Ser. No. 356,819, filed on even date herewith by C. G. Braun and G. H. Howing. Simultaneously with chucking, the upper shank of the workpiece is engaged by a center 129, FIG. 12, which is aligned with the work spindle axis 6 or 11. The center is carried by a guide rod 131, FIGS. 1, 2 and 12, reciprocable in a bracket 132 that is adjustably secured to the work head, 5 or 12. Such reciprocation is effected by a piston 133 in a cylinder 134 in the bracket, the rod of the piston being connected to guide rod 131 by a plate 135.

Referring to FIG. 13, the carrier actuating cylinders 53, 53′ are simultaneously controlled by a solenoid operated reversing valve 136 connected to suitable hydraulic pressure and exhaust lines, not shown. The solenoid windings of the valve are controlled by electrical switches 139 and 141 which are closed respectively when the work heads, 5, 12, reach and depart from loading position, the control of the valve by switch 139 being through a time delay switch 142. Cylinders 102, 111, 126 of the conveyor actuators are similarly connected to the hydraulic lines by a solenoid reversing valve 143 also controlled by switches 139 and 141; and the chuck and center actuating cylinders 128, 134, are controlled by a solenoid reversing valve 144. One solenoid winding of this valve is controlled by switch 139 in series with a switch 145 that is closed only at the end of each cutting cycle of the machine. The other solenoid winding of the valve is controlled by a switch means 146 closed when racks 55, 55' of the carrier actuators conclude each work transfer stroke. Accordingly, in operation, when cutting is concluded, closing switch 145 and causing the work heads to move to loading position, which closes switch 139, pressure is applied (a) to cylinders 128, 134, to dechuck the work and retract the centers 129, (b) to cylinders 102, 111, 126, to cause the idle, return strokes of the conveyor actuators, and (c), with a slight delay, to cylinders 53, 53', to effect a work-transfer cycle of carriers 18, 23. Switch means 146 are closed at the conclusion of this cycle, to (d) cause cylinders 128 and 134 to chuck and center the work, and the cutting cycle to restart by the work heads moving from loading position toward cutting position. This opens switch 139 and closes switch 141 so that pressure is applied (e) to cylinders 102, 111 and 126, to advance the conveyors 17 and 22, and (f) to cylinders 53, 53', to effect the return strokes of the carrier actuating pistons.

The modification of the invention illustrated in FIGS. 14 to 23 is designed for bevel gears G having axial bores. It differs from the first described embodiment in the form and arrangement of (1) the means for delivering work gears to the roughing carrier which transfers them to and from roughing work spindle, (2) the roughing and finishing carriers and the actuating means therefor, (3) the work holders of the conveyor between the roughing carrier and the finishing carrier, and (4) a means for stripping work gears from the carriers. The parts of the machine which are essentially the same as parts of the modification shown in FIGS. 1 to 13, bear the same reference numerals.

Referring to FIG. 14, work gear blanks G are contained in a magazine 161 at a higher level than conveyor 22, and pass by gravity through an inclined chute 162 to a recess 163, at bottom of the chute structure, beneath a carrier 164 adjacent work head 5. A gate 165 in the chute is controlled in a known manner in time with operation of the carrier, so that one workpiece is delivered to the recess 163 at a time when the latter is empty during each operating cycle of the carrier.

Referring to FIGS. 14, 15 and 16, the carrier comprises a plate 167 moved along and about vertical axis 168 by an actuating mechanism, within housing 169, that is driven by a piston in cylinder 53 acting through rod 54, rack 55 and pinion 56. Plate 167 carries two pairs of pivoted jaws, 171 and 172, each pair being adapted to grip a work gear in the manner shown in FIG. 16. Upon downward motion of the carrier, jaws 171 engage a gear blank in recess 163, whose axis there is designated 173; and jaws 172 engage a roughed gear on the work spindle whose axis 6 is upright at this time. Upward motion of the carrier lifts the work gears, stripping the gear in jaws 172 from the work spindle. The carrier then swings about axis 168, to its position shown in broken lines in FIG. 15, to align the blank in jaws 171 with axis 6 and the gear in jaws 172 with a vertical axis 174 along which it is transferred to a work holder 175 on conveyor 22. Then by down motion of the carrier the blank is placed on the work spindle and the roughed gear in jaws 172 is placed on the conveyor; the chuck on the work spindle is actuated to grip the blank; and the carrier rises, the jaws 171, 172 thereby being stripped from the workpieces. After the work head is then swung forwardly to cutting position about axis 7, the carrier returns, empty, to its starting position. During this return it retraces the path it followed in the work transfer part of its cycle.

Figure 4:
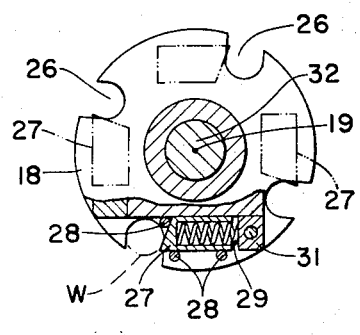
FIG. 4 is a plan view of the carrier, partly in horizontal section.

The actuating mechanism for the carrier, illustrated in FIGS. 17 to 19, differs from that in FIGS. 3 and 4 in the following respects: Pinion 56 is fixed to vertical shaft 176 so that the cam 177 on the latter is oscillated through 360° during each reciprocation of rack 55. The Geneva driven member 178 keyed to the carrier shaft 179 has a single radial slot 181 engageable by pin 182 of the Geneva driver 183 on shaft 176. Fine angular positioning of the carrier for aligning the jaws with axes 173, 6 and 174, is effected by an arm 184 that is secured to the upper end of shaft 179 and that has a bore 185, FIGS. 14 and 18, adapted for close sliding fit with either of two angularly spaced guide pins 186 on housing 169. The path of cam 177, developed into a plane in FIG. 19, includes two active sections, one of them between points 187 and 188 and the other between points 189 and 187, and a dwell section between points 188 and 189. The active sections each cause a reciprocation of the carrier along its axis at a time when the pin 182 is disengaged from radial slot 181; the dwell is effective to hold the carrier against such axial motion while the pin is engaged in the slot and is causing the carrier to swing about its axis. This shape of the cam is different from that of cam 35, FIG. 3, which is as shown in dotted lines in FIG. 19, being designed to effect only one vertical reciprocation per work transfer cycle.

The jaws 171 and 172, are essentially alike and are mounted on the plate 167 in the same manner, as shown in FIGS. 15 and 16, and are pivoted by pins 191 to upstanding bifurcations 192 on a member 193 secured to plate 167. Springs 194 acting between this plate and the jaws urge the latter about their pivots into engagement with the work gear. The work-engaging surfaces 195 of the jaws are so shaped as to cam apart, to receive or release a work gear. For centering and aligning the work gears on the carrier a tapered center plunger 196 is slidable in a central vertical bore in member 193 and is pressed downwardly into bore 197 of the gear by a spring 198; and a plate 199, guided by a plurality of pins 201 (only one of which is shown) secured to member 193, is pressed downwardly against the upper face 202 of the gear by springs 203 supported by the pins 201. Adjacent the finishing work head, on the slide 13 (see FIG. 1) the machine illustrated in FIG. 14 also has a carrier, similar to carrier 164, FIG. 16, but of opposite hand, for delivering rough cut gears to the finishing work spindle 10. This carrier has stock dividing means associated with the delivering jaws 172. These means comprise two spring-backed pins 210, FIG. 16, slidable in plate 199 and adapted to enter diametrically opposite or nearly opposite tooth slots, to rotate the gear into the desired angular relation to the carrier 164 as the gear is received by the jaws. Only one of the two pins 210 is shown.

The work holders 175, FIGS. 14 and 20, have pintles 204 for loosely entering the work gear bores 197, and are rigidly secured to links 63' of the conveyor 22. Slots 205 are provided in the peripheries of the work holders to receive the tips of the jaws 171 or 172, as indicated in FIG. 16, where a work holder 175 is shown in broken lines. Each work holder has a cylindrical surface 206 for engagement by a pivoted pawl 207 of an actuator 208, similar to actuators 101 and 109, which is provided for effecting step-by-step advance of the conveyor adjacent the roughing work head 5. A similar conveyor actuator, not shown, is provided adjacent the finishing work head.

For coarse stock dividing gears on the work holders 175 approaching the finish cutting station, the device shown in FIGS. 22 and 23 is provided. This device is mounted on the upper plates 71 of the conveyor guide adjacent axis 174' which corresponds to roughing station axis 174, FIG. 14, in that it is the axis along which gears are transferred between the conveyor 22, 175, and the work carrier 164. It comprises converging guides 209 mounted on a support 211 for aligning with axis 174' the axes of approaching workpieces G loosely held on supports 175 by pintles 204. After such alignment, the approaching gears are guided by and between parallel rails 212, 213 that are supported by guides 209. Rail 212 has therealong several leaf spring fingers 214 and rack teeth 215 for engaging in tooth slots of each gear, as it approaches axis 174′, and rotating the gear into an angular position such that its tooth slots are aligned to receive stock dividing pins 210, FIG. 16, of the finishing station carrier 164.

After finish cutting by cutter C-2, the finishing station carrier removes the gears from the spindle and then discharges them from the machine, preferably through a chute similar to that shown at 25 in FIG. 1. The release of the gears from the carrier above such chute, and also the release from roughing station carrier 164 of gears on axis 174, FIG. 14, is effected by plungers 216, FIG. 21, backed by springs 217 and slidably supported by brackets 218 secured to the upper plates 71 of the adjacent conveyor guide sections. The plungers are cammed radially outward of the gears by back cones 219 of the latter as the carriers lower the gears into the discharge chute and along axis 174 and then pressed inwardly by springs 217 to engage face cones 221 of the gears. The springs 217 are of sufficient strength relative to springs 194, FIG. 16, to hold the gears down while the carriers are subsequently raised, to thereby strip the gears from the jaws.

We claim:

1. A tooth cutting machine having two substantially parallel work spindles, a work carrier adjacent each spindle arranged for angular indexing about an axis substantially parallel to the spindles to carry workpieces successively to and from the spindles, an endless flexible conveyor having work holders equally spaced therealong and arranged to carry workpieces from one to the other of said carriers, means for actuating said carriers, and means for intermittently operating said conveyor in time with actuation of the carriers, the conveyor upon each such operation moving through a distance corresponding to the spacing of the work holders therealong which is such that upon each operation of the conveyor one work holder is brought to one carrier and another to the other carrier, one such operation of the conveyor occurring between successive actuations of the carriers, the means for intermittently operating said conveyor comprising a pair of ratcheting actuators for intermittently advancing the conveyor, said actuators being arranged to act on portions of the conveyor adjacent the respective work carriers, and means connecting said actuators for simultaneous operation.

2. A tooth cutting machine having two substantially parallel work spindles, a work carrier adjacent each spindle arranged for angular indexing about an axis substantially parallel to the spindles to carry workpieces successively to and from the spindles, an endless flexible conveyor having work holders equally spaced therealong and arranged to carry workpieces from one to the other of said carriers, means for actuating said carriers, and means for intermittently operating said conveyor in time with actuation of the carriers, the conveyor upon each such operation moving through a distance corresponding to the spacing of the work holders therealong which is such that upon each operation of the conveyor one work holder is brought to one carrier and another to the other carrier, one such operation of the conveyor occurring between successive actuations of the carriers, said carriers having workpiece supporting recesses in the peripheries thereof, detent means for releasably retaining said shanks in said recesses, and a stationary cam adjacent said other one of said carriers for ejecting workpieces therefrom by and during an angular indexing of the carrier which follows removal of said workpieces from the adjacent spindle.

3. A tooth cutting machine having a pair of work spindles, a work carrier adjacent each spindle arranged for angular indexing about and reciprocation along an axis parallel to the spindle to carry workpieces successively to and from said spindle, a conveyor having spaced workholders thereon for transferring workpieces from one carrier to the other, means for intermittently operating the conveyor and between successive such operations effecting reciprocations and angular indexing of the carriers, with a reciprocation preceding each indexing, the reciprocation serving to place workpieces on the work spindles and work holders, and the indexing serving to carry workpieces from one spindle to the work holders and from the latter to the other spindle, said carriers having two sets of spring-closed jaws for respectively engaging a workpiece being received by the carrier and a workpiece on the adjacent work spindle during one stroke of one reciprocation of the carrier, and means engaging workpieces in one set of jaws, subsequent to angular motion of the carrier to carry such workpieces from the spindle to the point of discharge from the carrier, to strip the workpieces from the jaws during an opposite stroke of reciprocation of the carrier.

4. A tooth cutting machine having two substantially parallel work spindles, a work carrier adjacent each spindle arranged to transfer workpieces successively to and from the spindle, an endless flexible conveyor having work holders equally spaced therealong and arranged for intermittent motion to carry workpieces from one to the other of said carriers, first and second guides respectively determining the two paths of said endless conveyor between said carriers, and adjusting means for each of said guides to vary the lengths of said paths, to enable the simultaneous registration of work holders with both carriers.

5. A machine according to claim 4 in which said guides are so arranged that said two paths of said endless conveyor are each of substantially U-shape, with one such U-shaped path substantially inside of the other, and said paths being connected at the open ends of their U-shapes by semi-circular portions which are tangential to the circular paths of motion workpieces on said carriers, and said adjusting means being arranged for adjusting the lengths of the legs of said U-shaped paths.

6. A machine according to claim 5 having a rotary cutter adjacent each work spindle, and a cutter spindle supporting both of said cutters, said legs of said U-shaped paths being perpendicular to the axis of said cutter spindle.

7. A machine according to claim 6 in which each work carrier and the work spindle related thereto is mounted on a support which is adjustable relative to the cutter spindle in a direction parallel to said legs.

8. A tooth cutting machine having two work spindles and an endless flexible conveyor for transferring workpieces between said spindles, a member supporting each spindle for rotation and means for reciprocating one member relative to the other in a direction parallel to the axes of said spindles in the work loading and unloading positions of the latter, and a guide for the conveyor comprising a terminal guide section, adjacent each member, which is secured to the member and supports the two portions of the conveyor between the spindles substantially in a plane perpendicular to said direction, and an intermediate guide section, for supporting portions of the conveyor between said terminal guide sections, having articulated connections to said terminal guide sections to accommodate the reciprocation of the slide member.

9. A machine according to claim 8 in which both portions of said endless conveyor are of substantially U-shape, with one such U-shaped portion inside of the other and connected at the open ends of their U-shapes by substantially semi-circular portions, and with the base of each U substantially straight and connected by arcuate portions to the legs of the U, said intermediate guide section supporting the portions of the conveyor at the substantially straight base of the U, and said articulated connections comprising pivots whose axes substantially parallel said legs.

10. A tooth cutting machine having a pair of substantially parallel vertical work spindles on opposite sides thereof, tooth cutting means forward of said spindles, a work carrier adjacent each spindle arranged for angular indexing about and reciprocation along an axis substantially parallel to the spindle to carry workpieces successively to and from the spindle, and endless flexible conveyor having work holders spaced therealong and arranged to carry workpieces from one to the other of said carriers, guide means for said conveyor extending substantially horizontally along the sides and around the back of the machine, providing two guide paths of said conveyor each of which is of substantially U-shape, with one U-shaped path substantially inside the other, and said paths being connected at the open ends of their U-shapes by semi-circular portions adjacent the respective carriers, and means for intermittently operating said conveyor in time with actuation of the carriers, the conveyor upon each such operation moving through a distance corresponding to the spacing of the work holders therealong which is such that upon each operation of the conveyor one work holder is brought to one carrier and another to the other carrier, one such operation of the conveyor occurring between successive actuations of the carriers.

References Cited

UNITED STATES PATENTS

| 2,376,161 | 5/1945 | Maud et al. | 74—422 |
| 2,736,238 | 2/1956 | Moncrieff | 90—1 |
| 2,773,426 | 12/1956 | Fowler et al. | 90—1 |
| 2,995,068 | 8/1961 | Mills | 90—1 |

FOREIGN PATENTS

| 1,074,367 | 1/1960 | Germany. |

LEONIDAS VLACHOS, *Primary Examiner.*